Nov. 12, 1957 W. HESS 2,812,702
COWL VENTILATOR
Filed Jan. 12, 1954 3 Sheets-Sheet 1
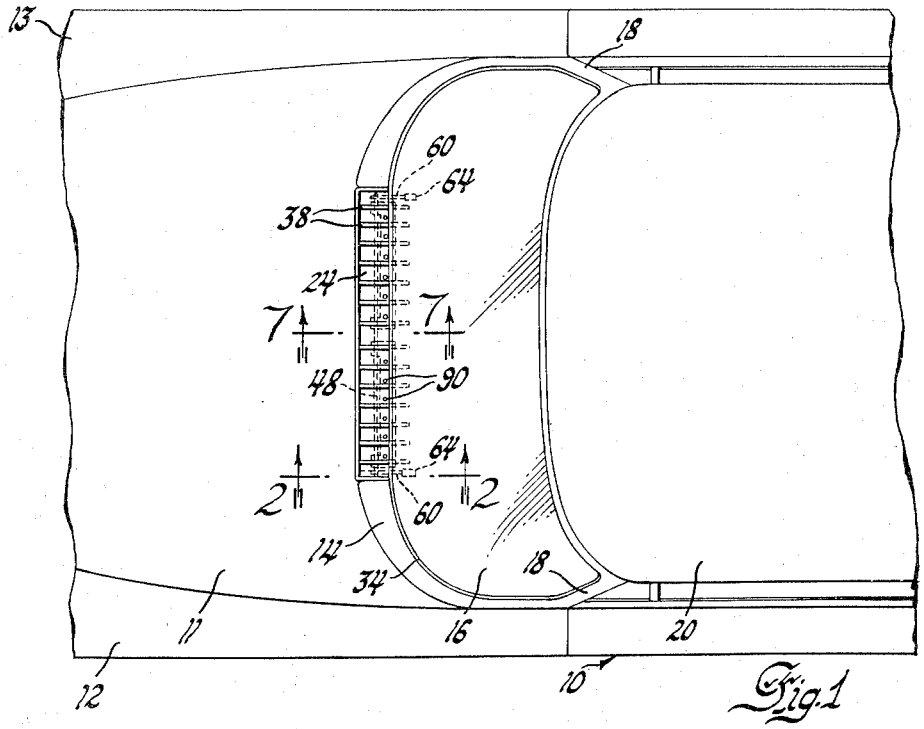
Fig. 1
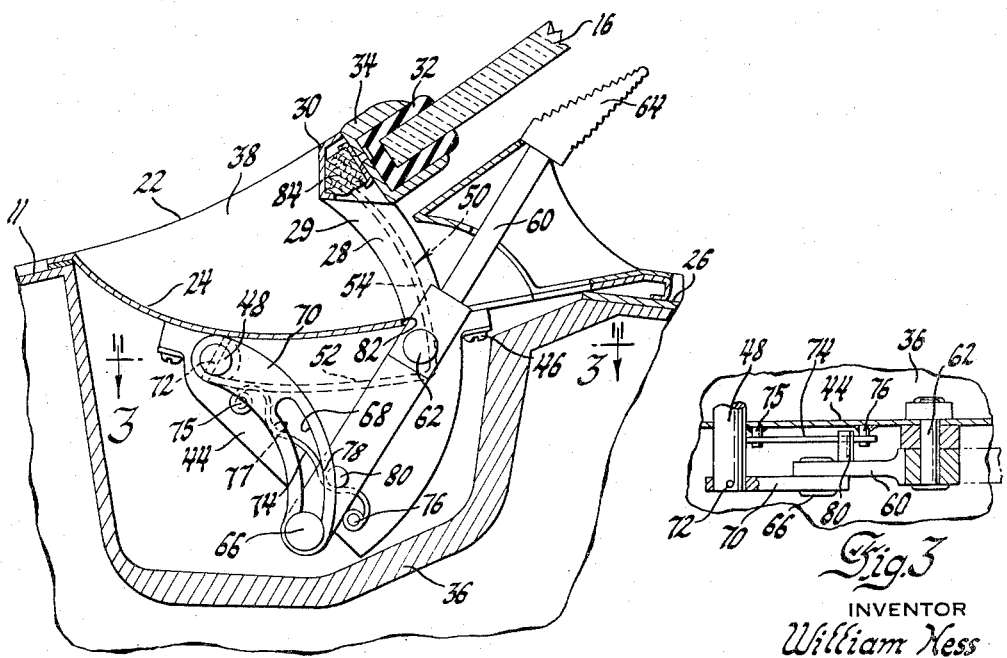
Fig. 2
Fig. 3
INVENTOR
William Hess
BY
Paul Fitzpatrick
ATTORNEY

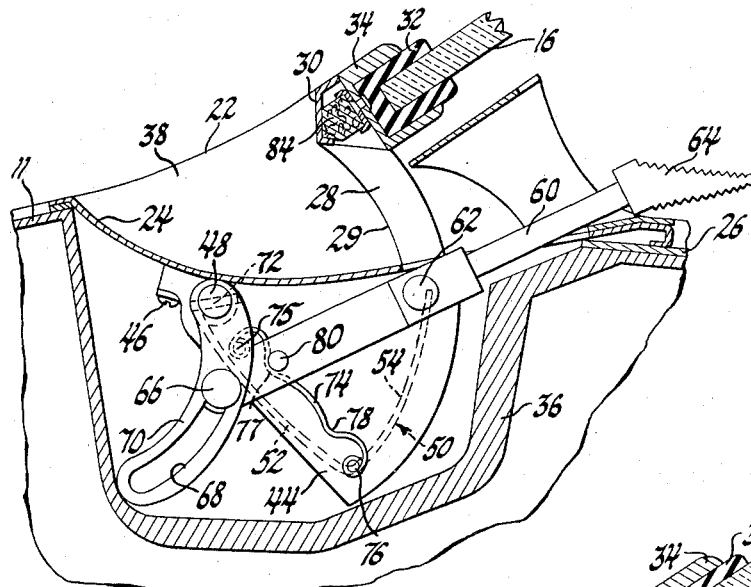
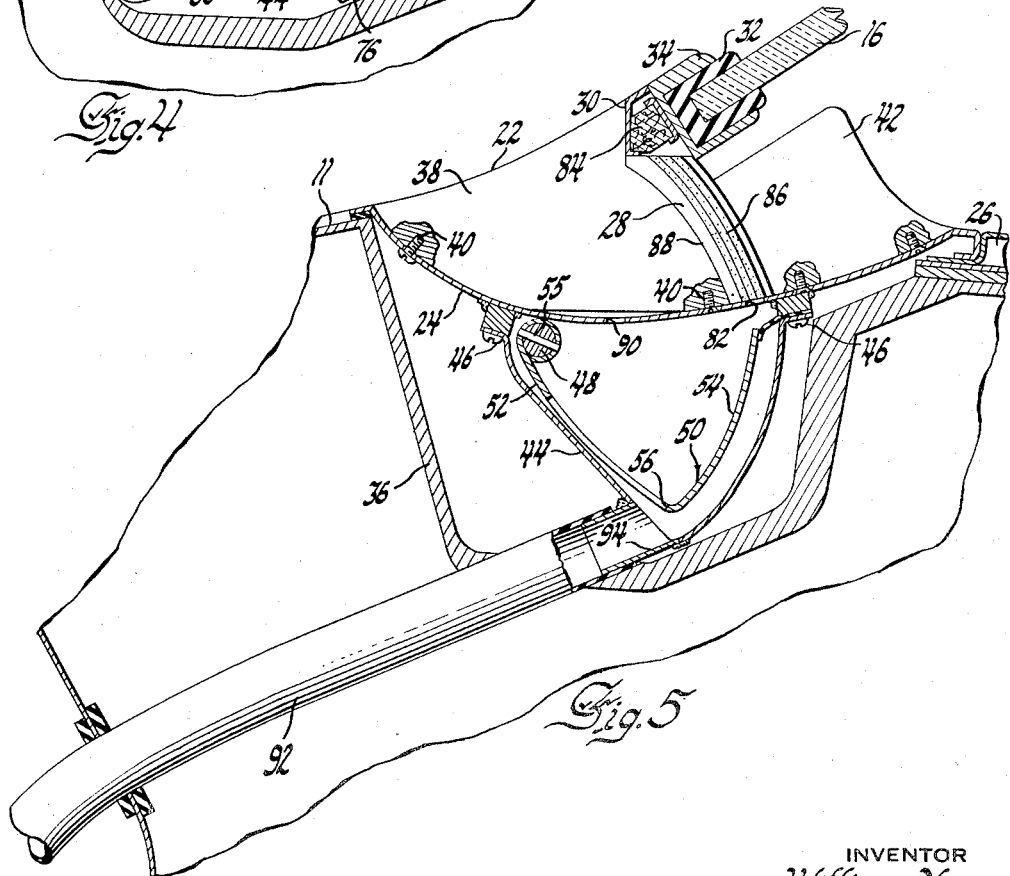

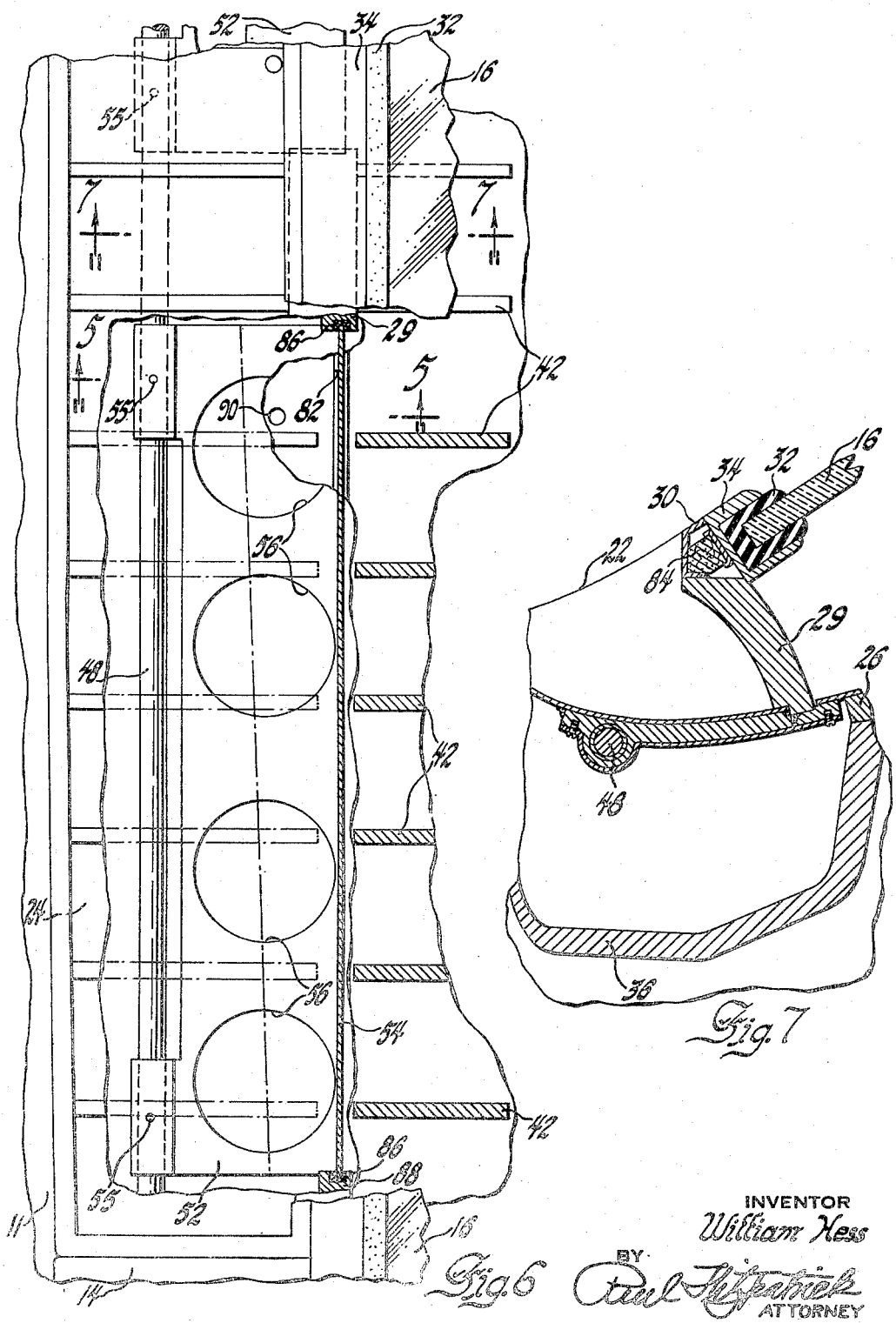

United States Patent Office 2,812,702
Patented Nov. 12, 1957

2,812,702

COWL VENTILATOR

William Hess, Birmingham, Mich., assignor to General Motors Corporation, Detroit, Mich., a corporation of Delaware Application January 12, 1954, Serial No. 403,486

3 Claims. (Cl. 98—2)

This invention relates to automobile ventilating means, and more particularly to cowl ventilators for an automobile.

One feature of the invention is that it provides an improved automobile ventilator; another feature of the invention is that its provides separate ventilators for the driver and the passenger, the ventilators being located on opposite sides of the longitudinal center of the automobile, and both ventilators being operable synchronously; still another feature of the invention is that separate operating means are provided adjacent each of the two ventilators and means are provided interconnecting the ventilators to synchronize their movement by either operating means; yet a further feature of the invention is that it provides novel ventilators, each including a shutter member mounted on the automobile cowl for movement between open and closed positions and cam means for moving the shutter between open and closed positions; still another feature of the invention is that a trough is mounted below a recessed portion of the automobile cowl, and a ventilating shutter is mounted in the trough for movement between open and closed positions through a slot in the recessed portion of the cowl; yet another feature of the invention is that yieldable detent means are provided for releasably holding the shutter in a selected position; and still a further feature of the invention is that the recessed portion of the cowl has drain holes for draining water into the trough below the cowl and the trough has a drain hose connected thereto.

Other features and advantages of the invention will be apparent from the following description and from the drawings, in which:

Fig. 1 is a fragmentary top plan view of an automobile having the improved ventilators;

Fig. 2 is an enlarged vertical section through one of the ventilators taken along the line 2—2 of Fig. 1 and showing the ventilator open;

Fig. 3 is a horizontal section through a portion of the operating means for one of the ventilators taken along the line 3—3 of Fig. 2;

Fig. 4 is a section similar to Fig. 2, but showing the ventilator closed;

Fig. 5 is a section through the ventilator taken along the line 5—5 of Fig. 6;

Fig. 6 is a top plan view, partly in section, of a portion of the ventilator; and Fig. 7 is a sectional view through the ventilator between the two shutters, being taken along the lines 7—7 of Figs. 1 and 6.

Referring now more particularly to the drawings, an automobile indicated generally at 10 in Fig. 1 has a hood 11 flanked by front fenders 12 and 13. Rearwardly of the hood 11 the automobile body includes a cowl 14 and a windshield 16. At the sides, the windshield is held by front pillars 18, and at the top of the windshield is connected to the automobile roof 20.

The cowl 14 extends in a semi-elliptical pattern between the front pillars 18, and through most of its area, the cowl surface curves upwardly toward the windshield, the normal top surface of the cowl being designated by the line 22 in Figs. 2, 4, 5 and 7. In its center area, the cowl is cut away and a recessed portion is formed by a dished plate member 24 which extends beneath the lower edge of the windshield 16 into the interior of the automobile body and is secured to the dash panel 26 so that on each side of the center of the car there is an opening 28 beneath the windshield in the recessed area of the cowl. At the center, a blocking partition 29 divides the opening 28 into two portions.

An integral portion 30 of the cowl extends across the top of opening 28 adjacent the lower edge of the windshield 16, which seats in a peripheral cushioning channel 32 of rubber carried by a trim channel 34 which frames the windshield. A cowl reinforcing casting 36 underlies the cowl and is secured to the cowl and to the dash panel 26 of the automobile body.

A plurality of external fins 38 are mounted on plate 24 by means of bolts 40 (Fig. 5) at equally spaced intervals along the length of the recessed cowl portion, and complementary internal fins 42 are mounted on the plate 24 adjacent the lower edge of the windshield 16.

Shutter means are provided for closing the opening 28 when desired, one shutter being on one side of the longitudinal center line of the automobile and another being on the opposite side of said center line. This closure apparatus is similar at both sides of the car, and the apparatus at one side only will be described. At each side of the center of the car, a pan or trough 44 is secured to the under surface of the recessed cowl member 24 by means of bolts 46, and a shaft 48 is journaled for rockable movement in both troughs 44. A shutter member 50 has a lever arm 52, which is connected to shaft 48 by pins 55, and an angularly extending arcuate closure arm 54. As seen in Figs. 2, 4 and 5, the shutter member is V-shaped in transverse section, and the lever arm 52 is preferably formed with a plurality of openings 56 shown in Figs. 5 and 6 which act as drainage openings and which serve to lighten the construction. If desired, the lever arm 52 of the shutter member may be replaced by equivalent narrow links at the ends of the shutter arm 54.

As shown in Figs. 1 and 6, shaft 48 extends the entire length of the recessed area of the cowl and two similar shutter devices are provided, one being on one side of the longitudinal center line of the automobile body, or adjacent the driver's side of the car, and the other being on the other side of said longitudinal center line or adjacent the passenger's side of the car. First and second operating means for the shutters are provided, one at each end of the recessed portion of the cowl, so that the shutters can be operated by the driver or by the passenger; and since the shutters are interconnected by the shaft 48, movement of the shutters is synchronized and both shutters can be operated together by either operating means.

The first and second operating means are similar to each other, and only the operating means on the driver's side will be explained in detail. Referring to Figs. 1, 2, 3 and 4, a handle 60 is pivotally mounted intermediate its ends on a stud 62 projecting outwardly from the outer end wall of the trough 44. One end of handle 60 projects upwardly into the passenger compartment of the automobile adjacent the lower edge of the windshield and carries a gripping head 64. The other end of the handle 60 mounts a rivet 66 which engages in a cam slot 68 of a cam link 70 which depends from shaft 48 and which is secured to this shaft by means of a pin 72.

In order to hold the ventilator releasably in open or closed position yieldable detent means are provided. As shown in Figs. 2, 3 and 4, a curved leaf spring 74 is fixedly mounted on studs 75 and 76 which are welded to and project from the end wall of trough member 44, The spring 74 has spaced detented portions 77 and 78, and a pin 80 which projects from the handle 60 engages the spring and is movable between the detented portions 75 and 76 upon movement of the handle. Spring force exerted by the leaf spring 74 releasably holds the handle 60 in the selected position.

As shown in Fig. 1, there is a similar handle 60 adjacent each opposite end of the recessed portion of the cowl so that both ventilator shutters may be operated by the driver or by the passenger.

Fig. 2 shows the ventilator in closed position, wherein the arcuate closure arm 54 projects through a slot 82 in the dished member 24, and the upper edge of the closure arm 54 seals against a rubber weatherstrip 84 carried by the upper cowl portion 30. As shown in Fig. 5, there is a sealing strip 86 which is carried in a groove in a vertical wall of a block 88 at the outer end of each shutter member, and similar sealing strips are carried by the block 29 at the inner end of each shutter. The ends of the closure arms engage the sealing strips so that the opening 28 beneath the windshield may be sealed closed by the closure arm 54.

In Figs. 4 and 5, the ventilator is shown in open position wherein the arcuate closure arm 54 is down in the trough 44 below the level of the recessed cowl portion. Outside air may now enter the passenger compartment through both openings 28. In order to move both shutters from the closed position of Fig. 2 to the open position of Fig. 4, either one of the handles 60 is moved in a clockwise direction as the parts appear in Figs. 2 and 4, the handle pivoting about the axis of stud 62 so that rivet 66 rides upwardly in cam slot 68, rocking shaft 48 in a clockwise direction and moving the closure arm 54 to retracted or open position. The handle which is not being manually operated is cammed by movement of shaft 48 and the associated cam link.

In the apparatus illustrated, both shutters are interconnected by shaft 48 so that both shutters may be operated by either handle. If desired, each shutter assembly may be separate from the other so that each control means operates only the associated shutter device.

Drain holes, one of which is shown at 90 in Fig. 5, are formed in member 24 so that water will drain from the recessed cowl portion into the trough member 44, the water escaping from the shutter member 50 into the trough member through the openings 56 in the lever arm portion 52 of the shutter member. Each of the shutter assemblies is provided with a drain tube, one of which is shown at 92 in Fig. 5, this tube being connected to a spout 94 on the trough member 44 and running through an opening in the automobile body wall.

While I have shown and described one embodiment of my invention, it is capable of many modifications. Changes, therefore, in the construction and arrangement may be made without departing from the spirit and scope of the invention as set forth in the appended claims.

I claim:

1. Automobile ventilating means of the character described, including: a cowl and a windshield adjacent thereto, said cowl extending transversely across the automobile body and having a recessed portion with a slot therein extending transversely of the automobile body below said windshield; a trough member mounted on said cowl below the recessed portion thereof, said trough extending rearwardly beneath the windshield past said slot; a shutter formed as a V and having diverging arms; means for mounting said shutter at the end of one arm thereof in said trough member adjacent the underside of the recessed portion of the cowl for pivotal movement between an open position wherein the other arm of said shutter lies entirely below the recessed portion of the cowl and a closed position wherein said other arm projects through said slot into engagement with a portion of the cowl adjacent the windshield; a cam member connected to the first arm of said shutter, said cam member having a camming surface; and an operating handle pivotally mounted on said trough and having a cam follower engaging said cam surface for moving said shutter between open and closed positions upon movement of the handle.

2. Automobile ventilating means of the character described, including: a cowl and a windshield adjacent thereto, said cowl extending transversely across the automobile body and having a recessed portion with a slot therein extending transversely of the automobile body below said windshield; a trough member mounted on said cowl below the recessed portion thereof, said trough extending rearwardly beneath the windshield past said slot; a shutter formed as a V and having diverging arms; a shaft rotatably mounted in said trough and extending transversely of the automobile body adjacent the underside of the recessed portion of the cowl, said shutter being fixed to said shaft at the end of one arm of the shutter for pivotal movement between an open position wherein the other arm of said shutter lies entirely below the recessed portion of the cowl and a closed position wherein said other arm projects through said slot into engagement with a portion of the cowl adjacent the windshield; a cam member fixed to said shaft, said cam member having a camming surface; and an operating handle pivotally mounted on said trough and having a cam follower engaging said cam surface for turning said shaft and moving the shutter between open and closed positions upon movement of the handle.

3. Automobile ventilating means of the character described, including: a cowl and a windshield adjacent thereto, said cowl extending transversely across the automobile body and having a recessed portion with a slot therein extending transversely of the automobile body below said windshield; a resilient sealing member mounted on the cowl adjacent said windshield; a trough member mounted on said cowl below the recessed portion thereof, said trough extending rearwardly beneath the windshield past said slot; a shutter formed as a V and having diverging arms; a shaft rotatably mounted in said trough and extending transversely of the automobile body adjacent the underside of the recessed portion of the cowl, said shutter being fixedly mounted on said shaft at the end of one arm of the shutter for pivotal movement between an open position wherein the other arm of said shutter lies entirely below the recessed portion of the cowl and a closed position wherein said other arm projects through said slot into engagement with said sealing member; a cam member fixed to said shaft, said cam member having an arcuate camming slot formed therein; and an operating handle pivotally mounted intermediate its ends on said trough and having a cam follower projecting therefrom at one end into said camming slot for pivoting said shutter between open and closed positions upon movement of the handle.

References Cited in the file of this patent

UNITED STATES PATENTS

| 1,142,792 | Bailey | June 15, 1915 |
| 1,355,079 | Hunt | Oct. 5, 1920 |
| 1,426,840 | Rice | Aug. 22, 1922 |
| 1,536,340 | Hammerl | May 5, 1925 |
| 1,670,090 | Achen | May 15, 1928 |
| 1,726,792 | Altman et al. | Sept. 3, 1929 |
| 1,921,976 | Kraft | Aug. 8, 1933 |
| 2,036,485 | Lintern et al. | Apr. 7, 1936 |
| 2,043,089 | Ball | June 2, 1936 |
| 2,049,701 | Guyot | Aug. 4, 1936 |
| 2,231,011 | Horton | Feb. 11, 1941 |
| 2,232,981 | Swanson | Feb. 25, 1941 |
| 2,510,790 | Arnold | June 6, 1950 |

FOREIGN PATENTS

| 530,926 | France | Oct. 12, 1921 |
| 619,339 | Great Britain | Mar. 8, 1949 |